(12) United States Patent
Ryu et al.

(10) Patent No.: US 8,993,924 B2
(45) Date of Patent: Mar. 31, 2015

(54) TARGET OBJECT PROCESSING METHOD AND TARGET OBJECT PROCESSING APPARATUS

(75) Inventors: Beng So Ryu, Incheon-si (KR); Byong Shik Lee, Gyeonggi-do (KR); Hyeon Sam Jang, Gyeonggi-do (KR); Bum Joong Kim, Gyeonggi-do (KR)

(73) Assignees: QMC Co., Ltd., Anyang (KR); Beng So Ryu, Incheon (KR)

( * ) Notice: Subject to any disclaimer, the term of this patent is extended or adjusted under 35 U.S.C. 154(b) by 192 days.

(21) Appl. No.: 13/097,909

(22) Filed: Apr. 29, 2011

(65) Prior Publication Data

US 2012/0111310 A1 May 10, 2012

(30) Foreign Application Priority Data

Apr. 30, 2010 (KR) ........................ 10-2010-0041077

(51) Int. Cl.
| | |
|---|---|
| *B23K 26/00* | (2014.01) |
| *C03B 33/09* | (2006.01) |
| *B23K 26/06* | (2014.01) |
| *B23K 26/073* | (2006.01) |
| *B23K 26/08* | (2014.01) |
| *C03B 33/02* | (2006.01) |

(52) U.S. Cl.
CPC .......... *C03B 33/091* (2013.01); *B23K 26/0042* (2013.01); *B23K 26/0057* (2013.01); *B23K 26/0635* (2013.01); *B23K 26/0648* (2013.01); *B23K 26/0736* (2013.01); *B23K 26/0853* (2013.01); *B23K 26/0869* (2013.01); *B23K 2201/40* (2013.01); *C03B 33/0222* (2013.01)

USPC ..................................................... 219/121.72

(58) Field of Classification Search
USPC ............ 219/121.67, 121.72, 121.73, 121.75, 219/121.85; 225/93.5; 264/482
See application file for complete search history.

(56) References Cited

U.S. PATENT DOCUMENTS

| | | | | |
|---|---|---|---|---|
| 6,448,534 | B1 * | 9/2002 | Kobsa | 219/121.72 |
| 6,498,319 | B1 * | 12/2002 | Matsumoto et al. | 219/121.72 |
| 6,526,089 | B1 * | 2/2003 | Haeno et al. | 372/101 |
| 7,388,172 | B2 * | 6/2008 | Sercel et al. | 219/121.72 |
| 2002/0008091 | A1 * | 1/2002 | Brandinger et al. | 219/121.67 |
| 2004/0002199 | A1 * | 1/2004 | Fukuyo et al. | 438/460 |
| 2009/0032510 | A1 * | 2/2009 | Ando et al. | 219/121.72 |
| 2009/0261083 | A1 | 10/2009 | Osajima | |

FOREIGN PATENT DOCUMENTS

| | | |
|---|---|---|
| KR | 10-0597948 | 6/2006 |
| WO | 2007/108589 | 9/2007 |
| WO | WO 2007108589 A1 * | 9/2007 |

* cited by examiner

*Primary Examiner* — Henry Yuen
*Assistant Examiner* — Brandon Harvey
(74) *Attorney, Agent, or Firm* — Lexyoume IP Meister, PLLC

(57) ABSTRACT

There is provided a target object processing method capable of self-breaking a target object with a laser beam. The target object processing method includes: generating a laser beam from a laser beam source; correcting a divergence angle of the generated laser beam; and forming a spot by condensing the corrected laser beam to the inside of the target object. A shape or a size of the spot is adjusted by correcting the divergence angle of the laser beam, a phase transformation area is formed within the target object by the spot, and the target object is subject to self-breaking with the phase transformation area as the starting point.

11 Claims, 15 Drawing Sheets

TARGET OBJECT PROCESSING METHOD AND TARGET OBJECT PROCESSING APPARATUS

This invention claims the priority benefit of Korean Patent Application No. 10-2010-0041077 filed on Apr. 30, 2010 is hereby incorporated by reference in its entirety.

FIELD OF THE INVENTION

The present disclosure relates to a target object processing method and a target object processing apparatus, and particularly relates to a target object processing method and a target object processing apparatus by using a laser beam for self-breaking the target object.

BACKGROUND OF THE INVENTION

Recently, as a laser technology advances, there has been used a method of scribing or cutting a target object such as a semiconductor substrate or a LED substrate using a laser beam for separating the target object into chips. Generally, in a scribing method using a laser beam, a scribing line is first formed on a substrate along a preset cut line by irradiating a laser beam to a surface of the substrate and the substrate is broken by a physical or thermal impact applied thereto.

However, in a conventional method, when the substrate is cut, fine dust may be generated, which may have a bad influence on element characteristics of the substrate. Further, in the conventional method, a cut section of a relatively large area may be formed, and, thus, there has been a limit in integrating a multiple number of stacked portions on a single wafer with high density. Furthermore, when the scribing line is formed on the surface of the substrate, substrate particles melted by heat of the laser beam may adhere to a periphery of the scribing line. It is not easy to remove the adhering particles since they are solidified when cooled. Consequently, the surface of the substrate may be uneven and the substrate may be cracked in unexpected directions when broken.

As one of scribing methods using a laser beam, there has been known a process of condensing laser beams into a substrate. However, in order to irradiate the laser beams into a thin substrate, a position and shape of a spot formed within the substrate needs to be accurately controlled. Particularly, a laser beam has its own divergence angle and there is a deviation in divergence angles even if the same kind of laser beam source is used, and, thus, it is difficult to form a spot appropriate for processing the inside of the substrate with a conventional laser beam transfer system.

Besides, in the above-described conventional methods, a separate cutting process is needed after the scribing process. In this cutting process, a considerable external force needs to be applied to the substrate, which results in an increase in the number of processes and processing time and causes an increase in costs. Further, if the scribing process is not performed accurately, the substrate may be cracked in unexpected directions or a cut surface may have a defect in the cutting process.

BRIEF SUMMARY OF THE INVENTION

In view of the foregoing circumstances, the present disclosure provides a target object processing method and a target object processing apparatus by using a laser beam for self-breaking the target object.

In accordance with a first embodiment of the present disclosure, there is provided a target object processing method capable of self-breaking a target object with a laser beam. The target object processing method includes: generating a laser beam from a laser beam source; correcting a divergence angle of the generated laser beam; and forming a spot by condensing the corrected laser beam to the inside of the target object. A shape or a size of the spot is adjusted by correcting the divergence angle of the laser beam, a phase transformation area is formed within the target object by the spot, and the target object is subject to self-breaking with the phase transformation area as the starting point.

In accordance with a second embodiment of the present disclosure, there is provided a target object processing apparatus capable of self-breaking a target object with a laser beam. The target object processing apparatus includes: a laser beam source capable of generating a laser beam; a beam shaping module capable of correcting a divergence angle of the laser beam; a condensing lens capable of condensing the corrected laser beam to the inside of the target object and forming a spot; and a controller connected with the laser beam source, the beam shaping module, and the condensing lens and capable of controlling these components. A shape or a size of the spot is adjusted by correcting the divergence angle of the laser beam, a phase transformation area is formed within the target object by the spot, and the target object is subject to self-breaking with the phase transformation area as the starting point.

The present disclosure provides a target object processing method and a target object processing apparatus capable of suppressing generation of fine dust which may have a bad influence on element characteristics, preventing generation of an amorphous section on a surface of a substrate, and integrating a multiple number of stacked portions on a single wafer with high density.

Further, the present disclosure provides a target object processing method and a target object processing apparatus capable of processing a substrate without deteriorating element characteristics of the substrate.

Furthermore, the present disclosure provides a target object processing method and a target object processing apparatus capable of forming a shape and size of a spot of a laser beam appropriate for processing the inside of a substrate by correcting an intrinsic divergence angle of the laser beam.

Moreover, the present disclosure provides a target object processing method and a target object processing apparatus capable of controlling a laser beam emission intensity profile formed within a substrate or energy density of the laser beam by correcting an intrinsic divergence angle of the laser beam.

Besides, the present disclosure provides a target object processing method and a target object processing apparatus capable of efficiently cutting a substrate in a specific direction by controlling a shape and size of a laser beam, or a laser beam emission intensity profile or energy density of the laser beam.

Further, the present disclosure provides a target object processing method and a target object processing apparatus capable of providing a cut surface in good condition and suppressing a decrease in light luminance.

BRIEF DESCRIPTION OF THE DRAWINGS

The present disclosure may best be understood by reference to the following description taken in conjunction with the following figures.

DETAILED DESCRIPTION OF THE PREFERRED EMBODIMENTS

Figure 1:
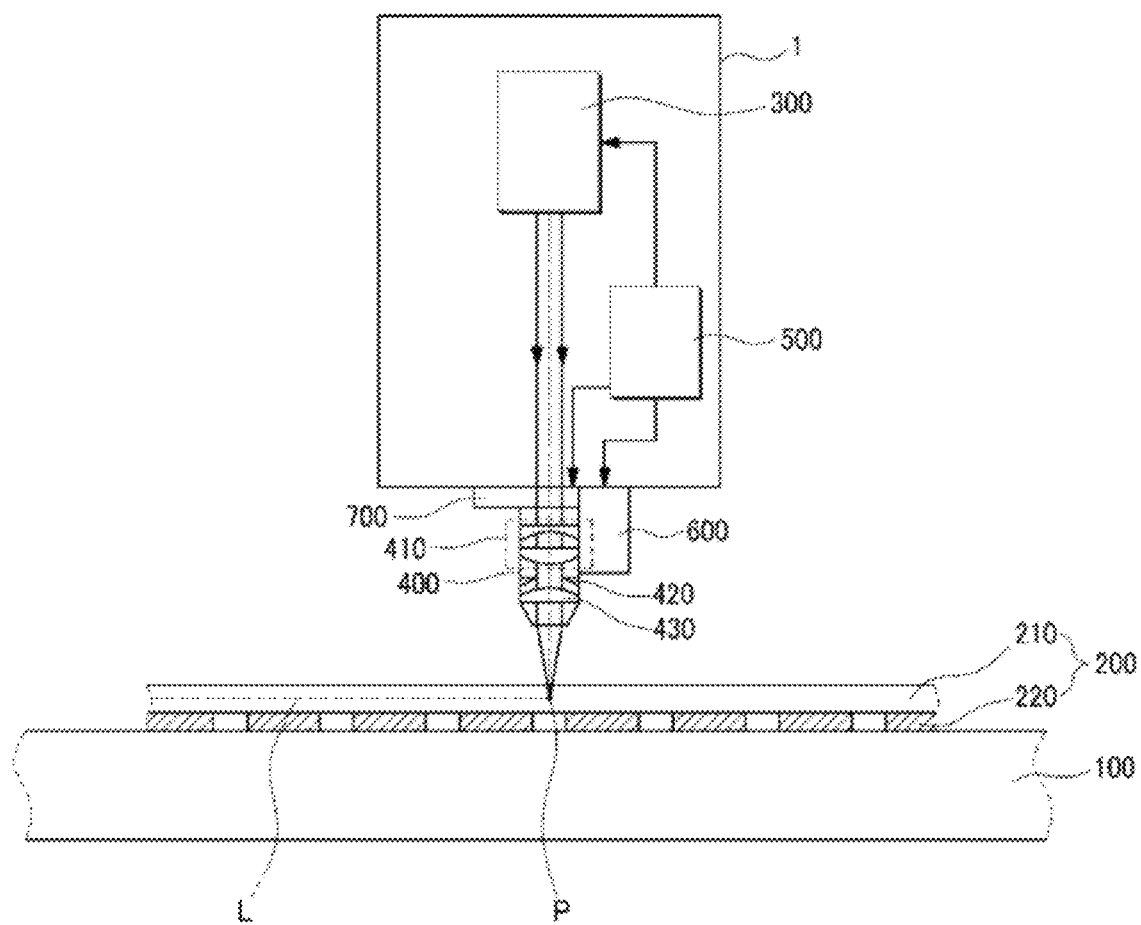
FIG. 1 is a configuration view schematically showing a target object processing apparatus in accordance with an embodiment of the present disclosure.

Hereinafter, embodiments of the present invention will be described in detail with reference to the accompanying drawings. However, it is to be noted that the present invention is not limited to the embodiments but can be realized in various other ways. In the drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements.

In the present disclosure, the term "wafer" means a substrate which is not yet cut, the term "LED chip" means a LED chip which can be obtained after a wafer is cut and before a package process is performed, and the term "LED package" means a device having gone through a package process. Further, in the present disclosure, the term "surface" of a wafer or a substrate means a top surface of a substrate on which a staked portion is formed, and the term "rear surface" of the wafer or the substrate means a bottom surface of the substrate as an opposite side of the surface.

Figure 2:
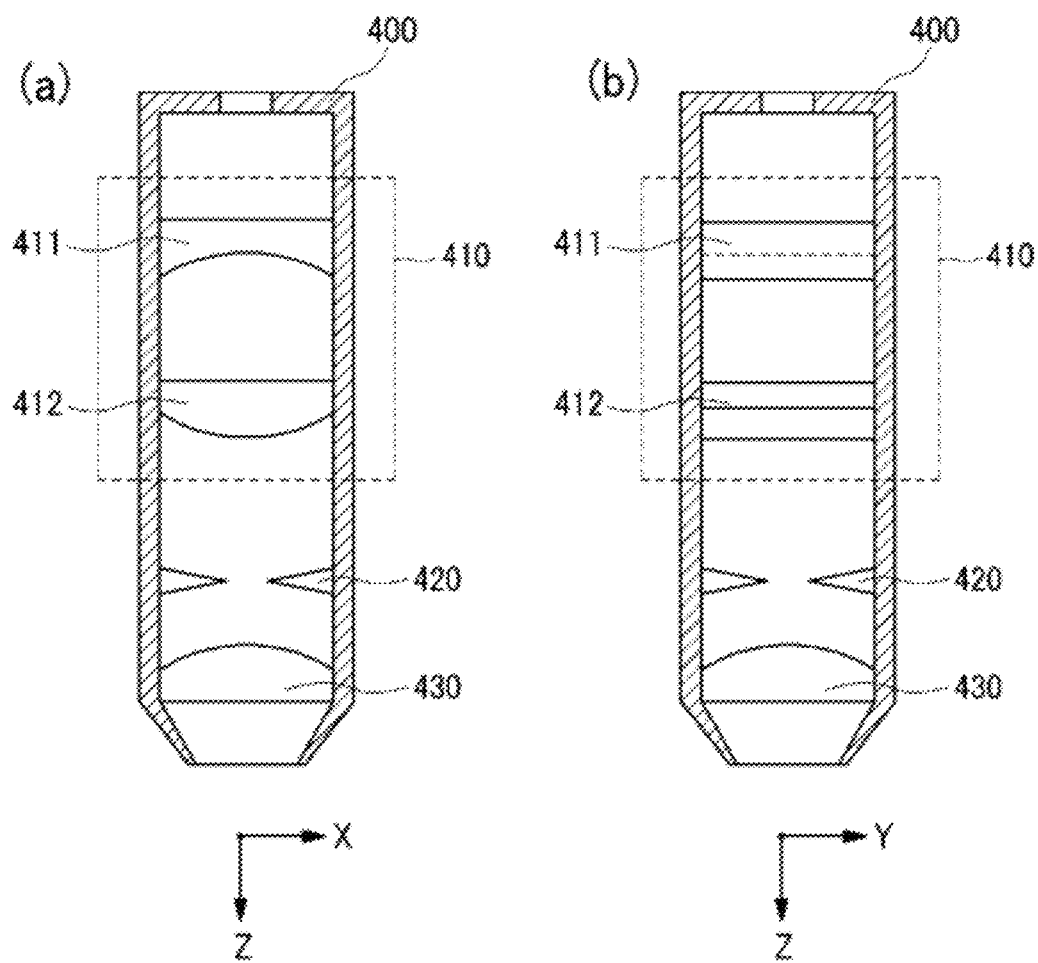
FIG. 2 is a cross-sectional view of an optical unit of the target object processing apparatus depicted in FIG. 1.

FIG. 1 is a configuration view schematically showing a target object processing apparatus in accordance with an embodiment of the present disclosure, and FIG. 2 is a cross-sectional view of an optical unit of the target object processing apparatus depicted in FIG. 1.

In an embodiment of the present disclosure, a target object processing apparatus 1 may include a mounting table 100 configured to mount thereon a target object 200, a laser beam source 300 configured to generate a laser beam, an optical unit 400 configured to control a characteristic and an optical path of a laser beam which passes through the optical unit 400, a controller 500 configured to control each component, a moving unit 600, and a light condensing distance adjusting unit 700.

The target object 200 may include a wafer 210 and stacked portions 220 formed on a surface of the wafer 210 (see FIG. 1). The target object 200 may be, but not limited to, a semiconductor substrate or a LED substrate. By way of example, the substrate may be a silicon (Si) wafer, a compound semiconductor wafer, a ceramic semiconductor substrate, a sapphire substrate, a metal substrate, and a glass substrate. Further, the LED may be, but not limited to, a single crystalline sapphire substrate, a single crystalline ZnO substrate, a single crystalline GaN substrate, and a single crystalline SiC substrate. As depicted in FIG. 1, the target object 200 is supported in a state where the stacked portions 220 face downward, i.e. where the laser beam is incident onto a rear surface of the target object 200. However, the target object 200 may be supported on the mounting table 100 in a state where the stacked portions 220 face upward, i.e. where the laser beam is incident onto a front surface of the target object 200.

The target object 200 may include the wafer 210 and the stacked portions 220 formed on the surface of the wafer 210. The stacked portions 220 may include one or more of a N—GaN layer, a P—GaN layer, an InGaN layer, a P-electrode layer, and a N-electrode layer.

When a LED chip is fabricated, a multiple number of nitride layers for forming functional devices are stacked on a surface of the target object 200 such as a sapphire substrate. The nitride layers may be formed by epitaxial growth using, for example, a MOCVD method.

Figure 20:
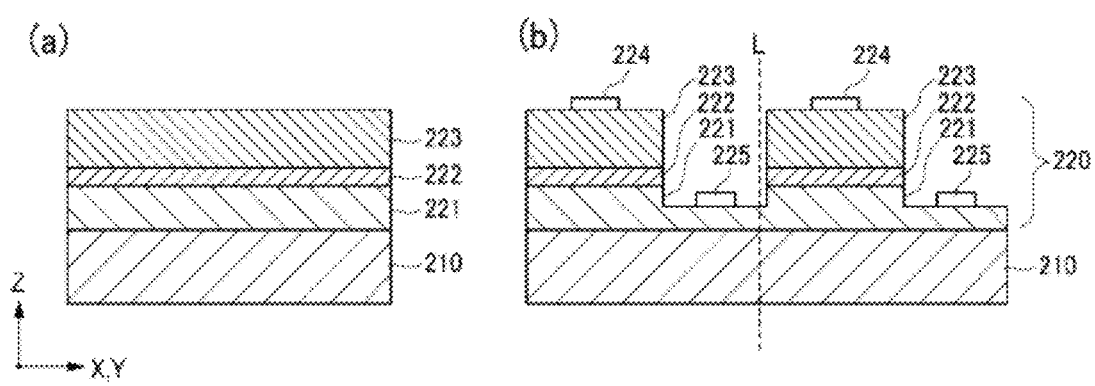
FIG. 20 is a cross-sectional view of stacked portions in accordance with an embodiment of the present disclosure.

FIG. 20(a) shows a state where a N—GaN layer 221, a InGaN layer 222, and a P—GaN layer 223 are stacked in sequence on the surface of the wafer 210. After the stacked substrate 200 is etched, a P-electrode layer 224 and a N-electrode layer 225 serving as leads connected with an external power supply are formed on the P—GaN layer 223 and the N—GaN layer 221, respectively. Here, the N—GaN layer 221, the InGaN layer 222, the P—GaN layer 223, the P-electrode layer 224, and the N-electrode layer 225 constitute a stacked portion 220 serving as a functional device (see FIG. 20(b)).

After the stacked portions 220 are formed on a surface of the wafer 210 as described above, the substrate 200 is cut along a preset cut line L depicted in FIG. 20(b), so that LED chips can be obtained. The preset cut line L can be drawn while avoiding functional devices on the stacked portions 220.

In the above-described embodiment, there has been explained a case in which the nitride layers are formed by the MOCVD method, but the present invention is not limited thereto. The nitride layers may be formed by another well-known method.

The mounting table 100 is configured to mount thereon the target object 200 and process the target object 200 to be in a shape as required by moving the target object 200 upward, downward and forward, backward or rotating the target object 200.

The laser beam source 300 is configured to generate a laser beam used to process the target object 200, and the generated laser beam passes through a scale-up/down process, or an output/polarization direction adjusting process in a series of non-illustrated apparatuses arranged along an optical axis of the laser beam source 300 and is incident onto a cylindrical concave lens 411 of the optical unit 400. In this case, the optical axis of the laser beam source 300 may be aligned in the same line with an optical axis of the optical unit 400.

The laser beam source 300 may be a solid laser beam source, a gas laser beam source or a liquid laser beam source. Desirably, the laser beam source 300 may have a Gaussian beam profile. The laser beam source 300 may be a laser beam source for any one of a CO2 laser beam, an excimer laser beam, and a DPSS laser beam.

The laser beam may be a pulse type laser beam, particularly, a short pulse laser beam. Here, the short pulse laser beam is a laser beam having a light pulse cycle in the nanosecond, picosecond or femtosecond range, and the short pulse laser beam is capable of processing a thin substrate with high accuracy and particularly useful for forming a spot within the substrate.

The optical unit 400 is configured to adjust the characteristic and the optical path of the laser beam which passes through the optical unit 400. The optical unit 400 may include a beam shaping module 410 and a condensing lens 430.

The beam shaping module 410 is configured to correct a divergence angle of the laser beam and may include the cylindrical concave lens 411 and a cylindrical convex lens 412 as depicted in FIG. 2.

The cylindrical concave lens 411 is positioned at an upper section of the optical unit 400 and configured to diverge a laser beam generated from the laser beam source 300. Since the laser beam has a single wavelength and collimation as compared to a general beam, it does not diffuse and proceeds in parallel with an optical axis while it is in progress. However, since the laser beam also has a property of a wave, it is influenced by diffraction and has a divergence angle to a certain degree. By way of example, in case of a gas laser beam (for example, a $CO_2$ laser beam and a He—Ne laser beam), generally, a divergence angle is about 1 mrad (0.05° or less).

Figure 3:
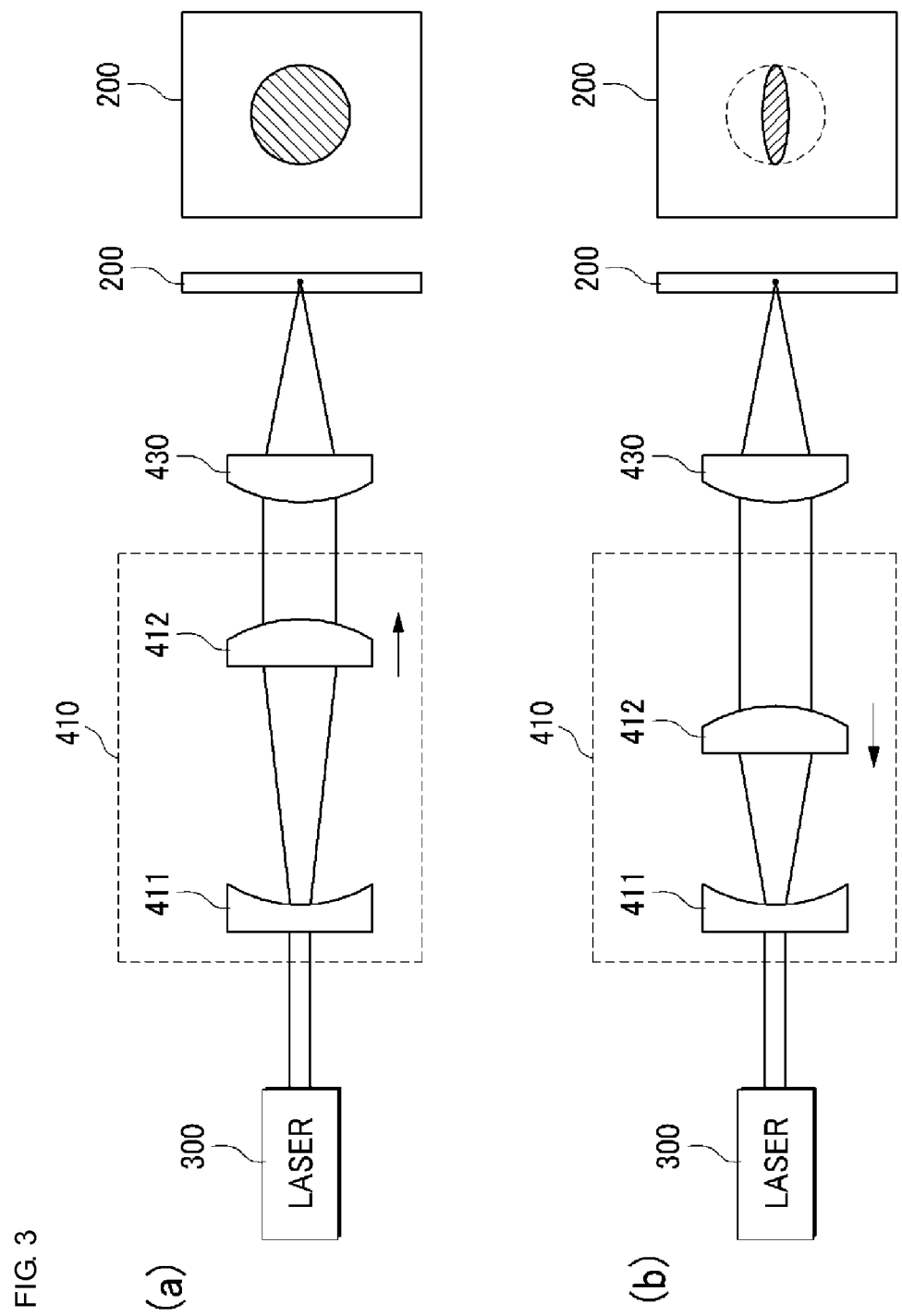
FIG. 3 is an explanatory diagram which shows a change in a shape of a spot depending on a distance between a cylindrical concave lens and a cylindrical convex lens in the optical unit depicted in FIG. 2.

In case of a spherical concave lens, both an X-axis directional component and its orthogonal Y-axis directional component of the laser beam diverge. However, in case of the cylindrical concave lens 411, only one of the X-axis directional component and its orthogonal Y-axis directional component diverges. By way of example, as depicted in FIG. 3, the cylindrical concave lens 411 may diverge only the X-axis directional component of the laser beam.

The laser beam diverged through the cylindrical concave lens 411 passes through the cylindrical convex lens 412, so that it is possible to correct a divergence angle of the laser beam to be a required angle.

That is, if the cylindrical concave lens 411 and the cylindrical convex lens 412 are used, a divergence angle of either one of the directional components (for example, the X-axis directional component) is corrected, and, thus, as for the spot, a size in only one direction (for example, an X-axis direction) is changed. By way of example, during a scribing process of the target object, if a major axis of the spot is aligned along a scribed direction, i.e. a preset cut line, a correction of a divergence angle may be not needed in the major axis direction of the spot. In other words, a required effect can be achieved by decreasing a size (for example, a minor axis of the spot or a width of the spot) in a direction perpendicular to the preset cut line and a decrease in a size (for example, a major axis of the spot or a length of the spot) in a direction along the preset cut line is unfavorable, and, thus, a divergence angle may be corrected in only one direction by aligning the cylindrical concave lens 411 and the cylindrical convex lens 412 in the same direction.

Further, a divergence angle of the laser beam may be corrected by adjusting a distance between the cylindrical concave lens 411 and the cylindrical convex lens 412, and a position of the cylindrical concave lens 411 or the cylindrical convex lens 412 may be changed by the moving unit 600 to be described later.

The beam shaping module 410 may further include a beam stopper 420. The beam stopper 420 is configured to prevent a part of the laser beam from passing through. By way of example, a slit or an opening is formed at the center of the beam stopper 420, so that a central part of the laser beam is allowed to pass through and a peripheral part of the laser beam is blocked. The peripheral part of the laser beam having a Gaussian beam profile does not have enough intensity, so that it may have a bad influence on the stacked portions 220 of the target object 200.

The condensing lens 430 condenses the corrected laser beam within the target object 200 and forms the spot P, and a phase transformation area T is formed within the target object 200 by the spot P. As described above, an axis directional size of the spot P may be changed by correcting the divergence angle of the laser beam.

The controller 500 performs various processes related with the laser beam source 300 and controls the moving unit 600 to adjust a distance between the cylindrical concave lens 411 and the cylindrical convex lens 412, thereby correcting a divergence angle of the laser beam. Further, the controller 500 controls the light condensing distance adjusting unit 700, which will be described later, to adjust a distance between the condensing lens 430 of the optical unit 400 and the spot P, i.e. a depth of the spot P within the target object.

In this case, the controller 500 may control the light condensing distance adjusting unit 700 such that a multiple number of spots P are formed in a longitudinal direction within the target object 200. Further, the controller 400 may control the light condensing distance adjusting unit 700 such that a multiple number of spots P are formed in a transversal direction within the target object 200.

The moving unit 600 may accurately control a divergence angle of the laser beam diverged from the cylindrical concave lens 411 by adjusting the distance between the cylindrical concave lens 411 and the cylindrical convex lens 412.

Hereinafter, there will be explained an operation of the optical unit in detail with reference to FIG. 3. FIG. 3 is an explanatory diagram which shows a change in a shape of a spot depending on a distance between a cylindrical concave lens and a cylindrical convex lens in the optical unit depicted in FIG. 2.

The laser beam generated from the laser beam source 300 is incident onto the cylindrical concave lens 411 and a divergence angle of the laser beam diverged through the cylindrical concave lens 411 is corrected by the cylindrical convex lens 412. If the laser beam generated from the laser beam source 300 is a perfect parallel beam, assuming that the distance between the cylindrical concave lens 411 and the cylindrical convex lens 412 is df1, a focal length of the cylindrical concave lens 411 is $f_{c1}$, and a focal length of the cylindrical convex lens 412 is $f_{v1}$, the spot of the laser beam formed within the target object becomes minimized when the following condition is satisfied.

$$d_{f1} = f_{c1} + f_{v1} \qquad \text{Equation 1}$$

However, an actual laser beam has a divergence angle to a certain degree, and, thus, a position where the spot of the laser beam becomes minimized is changed as expressed in the following equation.

$$d'_{f1} = (f_{c1} + \alpha) + (f_{v1} + \beta) \qquad \text{Equation 2}$$

Here, α denotes an increasing component of the cylindrical concave lens 411's focal length increased due to the divergence angle of the laser beam and β denotes an increasing component of the cylindrical convex lens 412's focal length increased due to the divergence angle of the laser beam.

Figure 14:
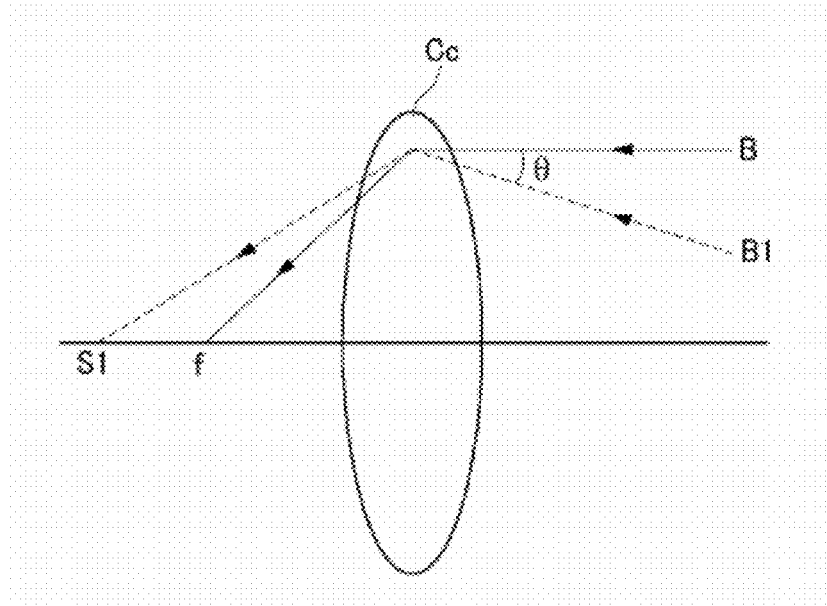
FIG. 14 is an explanatory diagram which shows an influence of a divergence angle of a laser beam when passing through a lens.

Referring to FIG. 14, there will be explained a modification in the above-described equation. Assuming that a laser beam is a perfect parallel beam, the laser beam passing through a lens $C_c$ may pass by a position on an optical axis line of the lens $C_c$ corresponding to a focal length f of the lens $C_c$ (see an optical path B depicted in FIG. 14). However, if a divergence angle of the laser beam is θ, the laser beam passing through the lens $C_c$ may pass by a position $S_1$ farther than the focal length f of the lens $C_c$ on the optical axis line of the lens $C_c$ (see an optical path $B_1$ depicted in FIG. 14). Here, an increasing component of the focal length, i.e. a distance between $S_1$ and f, becomes a function of θ.

Therefore, as depicted in FIG. 3, the beam shaping module is made up of a pair of the cylindrical concave lens 411 and the cylindrical convex lens 412, Equation 2 can be expressed as follows:

$$d'_{f1} = (f_{c1} + a(\theta)) + (f_{v1} + b(\theta)) \qquad \text{Equation 3}$$

Here, a(θ) and b(θ) denote an increasing component of the cylindrical concave lens 411's focal length increased due to the divergence angle of the laser beam and an increasing component of the cylindrical convex lens 412's focal length, respectively, and each of these components becomes a function of a divergence angle of a laser beam. Therefore, it is possible to correct a divergence angle by appropriately adjusting positions of the cylindrical concave lens 411 and the cylindrical convex lens 412 according to a divergence angle of each laser beam.

A size of a spot of the laser beam formed at a condensing point can be expressed as follows:

$$d \cong \frac{4\lambda f M^2}{\pi D} \qquad \text{Equation 4}$$

Here, $M^2$ is a beam quality factor and can be expressed as a function of a divergence angle as follows:

$$M^2 \cong \frac{\pi \theta D}{4\lambda} \qquad \text{Equation 5}$$

In Equations 4 and 5, f denotes a focal length of the condensing lens and D denotes a diameter of the laser beam incident onto the condensing lens. As can be seen from Equation 5, $M^2$ is proportional to the divergence angle θ of the laser beam, and as can be seen from Equation 4, the size d of the spot is proportional to $M^2$. Accordingly, the size d of the spot is proportional to the divergence angle θ of the laser beam. Therefore, if the divergence angle of the laser beam is set to a certain value, the size of the spot can be controlled by correcting this divergence angle.

Based on the above-described relationship, referring to FIG. 3 again, there will be explained a process of adjusting a shape of the spot in the beam shaping module made up of the cylindrical concave lens and the cylindrical convex lens.

As depicted in FIG. 3(a), it is assumed that if the cylindrical convex lens 412 moves in a direction as indicated by an arrow, a distance between the cylindrical concave lens 411 and the cylindrical convex lens 412 becomes distant from $d'_{f1}$ satisfying Equation 3. In this case, a width of the spot of the laser beam condensed by the condensing lens 430 becomes increased.

On the contrary, as depicted in FIG. 3(b), it is assumed that if the cylindrical convex lens 412 moves in a direction as indicated by an arrow, the distance between the cylindrical concave lens 411 and the cylindrical convex lens 412 becomes closer to $d'_{f1}$ satisfying Equation 3. In this case, the width of the spot of the laser beam condensed by the condensing lens 430 becomes decreased. If, desirably, the distance between the cylindrical concave lens 411 and the cylindrical convex lens 412 becomes $d'_{f1}$ satisfying Equation 3, the width of the spot of the condensed laser beam may be minimized.

As described above, by adjusting positions of the cylindrical concave lens 411 and the cylindrical convex lens 412, it is possible to control a shape of the spot, i.e. a width of the spot, within the target object 200. Generally, the shape of the spot may be expressed as a function of a size of an incident beam, a divergence angle, and a wavelength. However, as described above, it is possible to form a spot having a desired shape and size just by correcting the divergence angle. Therefore, it is very useful for, particularly, a scribing process by condensing a laser beam within a target object.

As described above, if the cylindrical concave lens 411 is used instead of the spherical concave lens, only one of the X-axis directional component and the Y-axis directional component of the laser beam diverges. By way of example, as depicted in FIG. 3, the X-axis directional component diverges but the Y-axis directional component passes through the cylindrical concave lens 411 without any change. That is, the Y-axis directional component of the laser beam is not at all influenced by the cylindrical concave lens 411.

Figure 7:
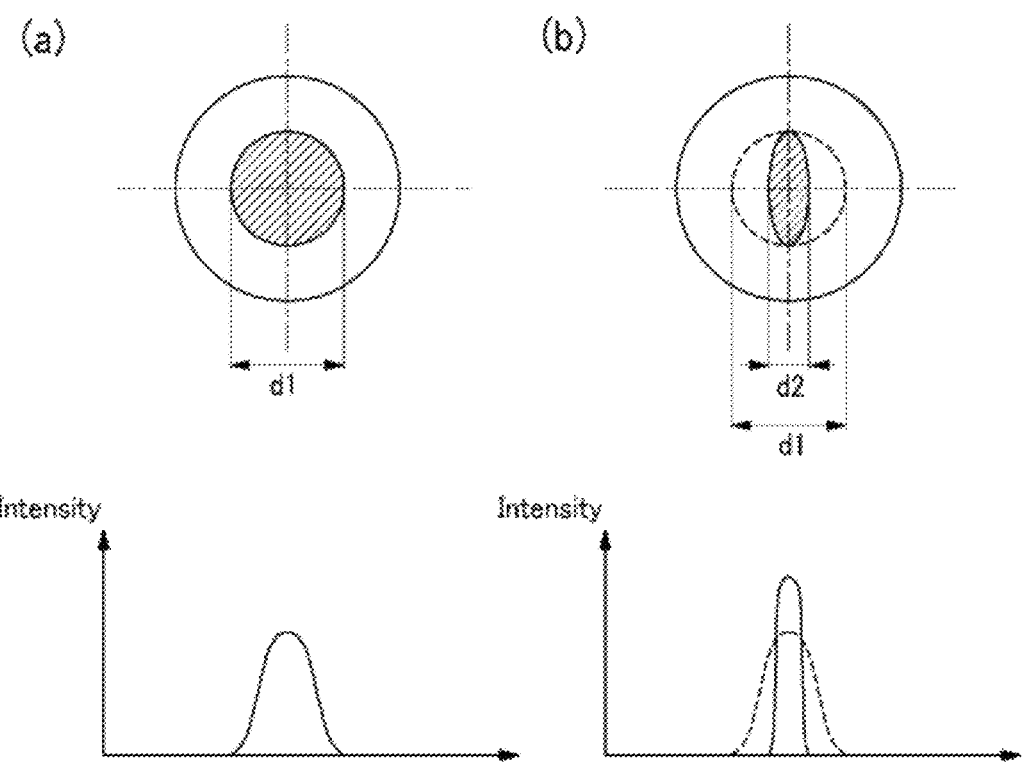
FIG. 7 is an explanatory diagram which shows a change in a light emission intensity profile depending on a change in a shape of a spot.

Referring to a light intensity graph of FIG. 7, it can be seen that a size of the spot is decreased due to a decrease in a width of the spot from d1 to d2, whereas overall light intensity is maintained, and, thus, light intensity per unit area becomes increased.

As described above, by adjusting the positions of the cylindrical concave lens 411 and the cylindrical convex lens 412 depending on the divergence angle of the laser beam, it is possible to control a shape of the spot to be an elliptical shape or closer to a linear shape. If a major axis of the elliptical or linear spot is aligned in a scribed direction, i.e. a preset cut line direction, of the target object 200, a processing rate is remarkably increased and the target object 200 may be subject to self-breaking just by irradiating the laser beam to the inside of the target object 200. The details thereof will be described later.

Hereinafter, there will be explained a configuration of an optical unit of a target object processing apparatus in accordance with another embodiment of the present disclosure with reference to FIG. 4.

Figure 4:
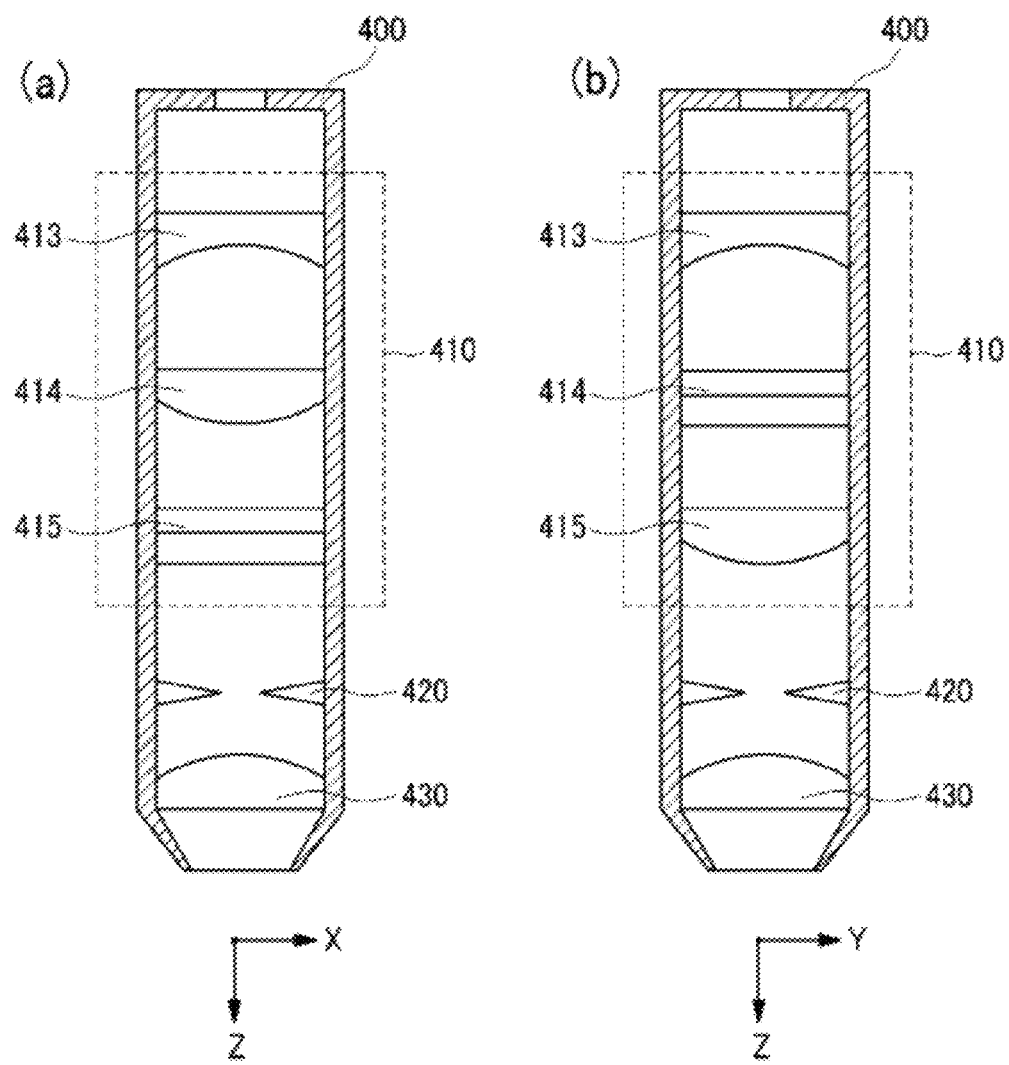
FIG. 4 is a configuration view schematically showing a target object processing apparatus in accordance with another embodiment of the present disclosure.

The beam shaping module 410 of the optical unit 400 in accordance with the present embodiment may include a movable spherical concave lens 413, a first cylindrical convex lens 414, and a second cylindrical convex lens 415 ad depicted in FIG. 4.

The spherical concave lens 413 is positioned at an upper section of the optical unit 400 and diverges a laser beam generated from the laser beam source 300. The spherical concave lens 413 is different from the above-described cylindrical concave lens 411 in that both an X-axis directional component and its orthogonal Y-axis directional component of the laser beam diverge. Since both the X-axis directional component and its orthogonal Y-axis directional component of the laser beam diverge, two cylindrical convex lenses capable of correcting a divergence angle of each of the X-axis directional component and the Y-axis directional component are needed in order to correct a divergence angle of the diverged laser beam.

The laser beam diverged through the spherical concave lens 413 passes through the first cylindrical convex lens 414 and the second cylindrical convex lens 415 in sequence. Positions of the spherical concave lens 413, the first cylindrical convex lens 414 and the second cylindrical convex lens 415 may be changed by the moving unit 600 in response to control instructions of the controller 500, and a shape or a size of the spot formed within the target object may be changed accordingly. The details thereof will be described with reference to FIGS. 5 and 6.

Figure 5:
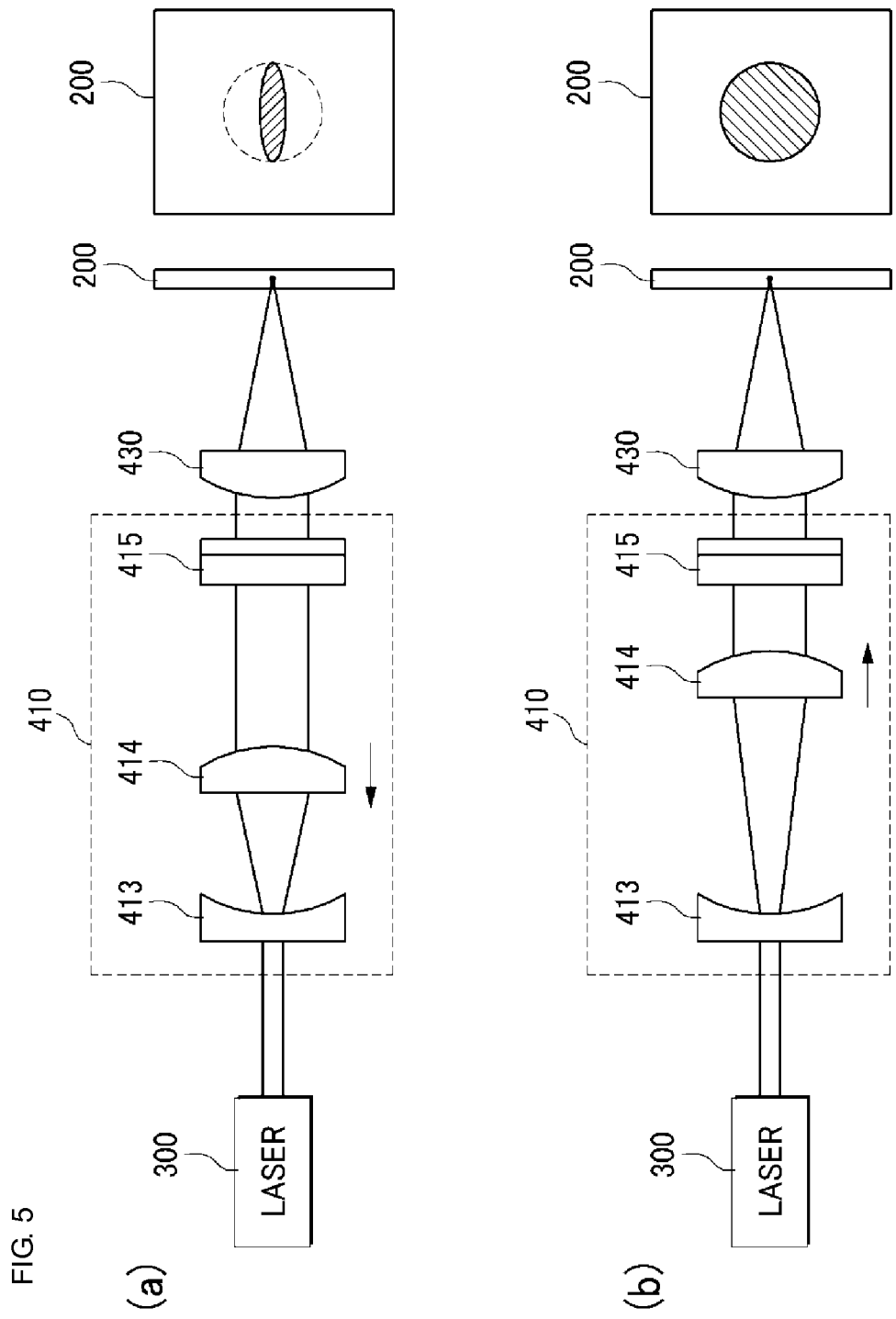
FIG. 5 is an explanatory diagram which shows a change in a shape of a spot depending on a distance between a spherical concave lens and a first cylindrical convex lens in an optical unit depicted in FIG. 4.
Figure 6:
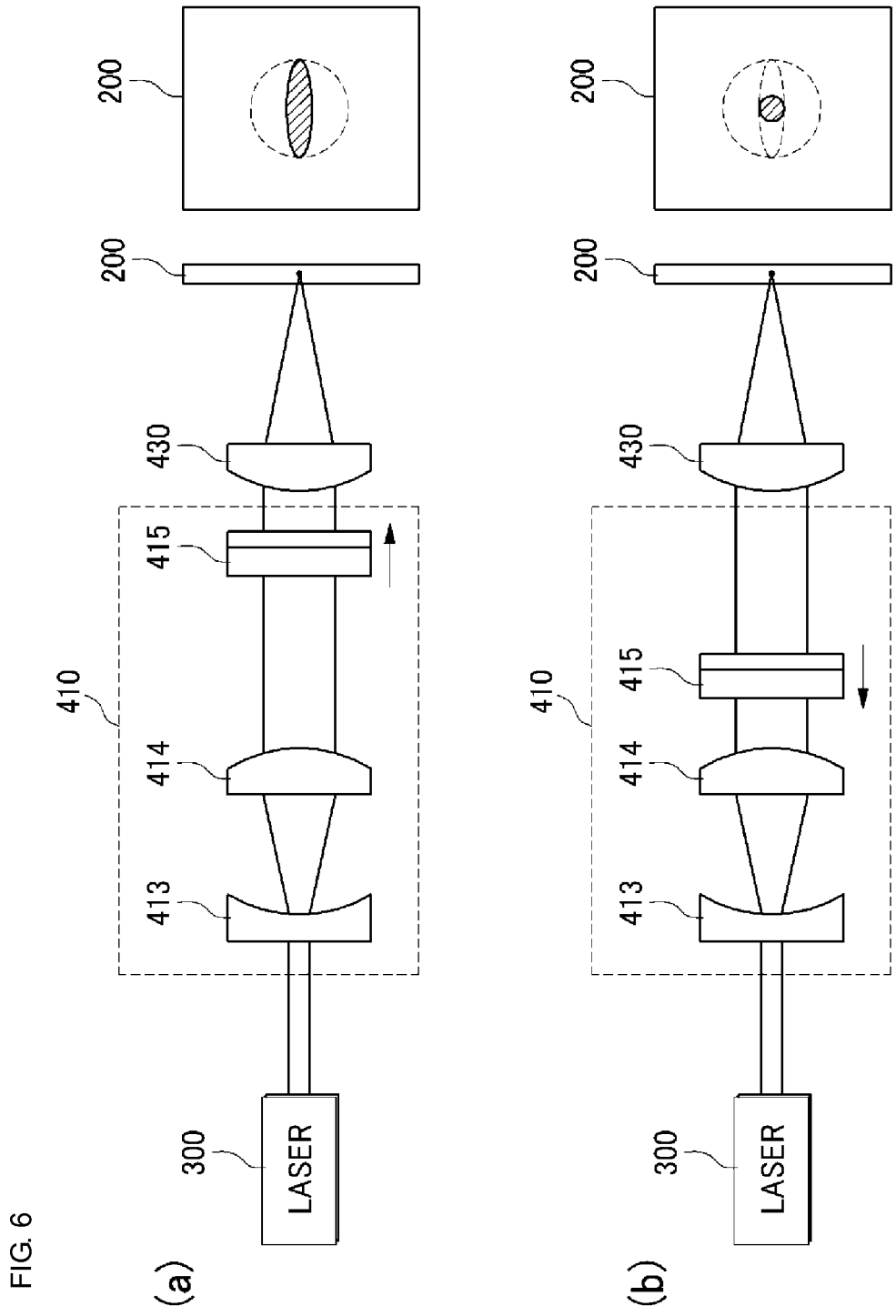
FIG. 6 is an explanatory diagram which shows a change in a shape of a spot depending on a distance between a spherical concave lens and a second cylindrical convex lens in an optical unit depicted in FIG. 4.

FIG. 5 is an explanatory diagram which shows a change in a shape of a spot depending on a distance between a spherical concave lens and a first cylindrical convex lens in an optical unit depicted in FIG. 4, and FIG. 6 is an explanatory diagram which shows a change in a shape of a spot depending on a distance between a spherical concave lens and a second cylindrical convex lens in an optical unit depicted in FIG. 4.

A laser beam generated from the laser beam source 300 is incident onto the spherical concave lens 413 and a divergence angle of an X-axis directional component of the laser beam diverged through the spherical concave lens 413 is corrected by the first cylindrical convex lens 414. Here, if a distance between the spherical concave lens 413 and the cylindrical convex lens 414 is close to the sum of a focal length of the spherical concave lens 413, a focal length of the first cylindrical convex lens 414 and an increasing component of a focal length depending of the divergence angle of the laser beam, a width of the spot of the laser beam condensed by the condensing lens 430 becomes decreased (see FIG. 5(a)). On the contrary, if the distance between the spherical concave lens 413 and the cylindrical convex lens 414 is distant from the sum of the focal length of the spherical concave lens 413, the focal length of the first cylindrical convex lens 414 and the increasing component of the focal length depending on the divergence angle of the laser beam, the width of the spot of the laser beam condensed by the condensing lens 430 becomes increased (see FIG. 5(b)). There has been explained a correction of the divergence angle of the X-axis directional component of the laser beam, which is the same as explained in the above-described embodiment with reference to FIG. 3, and, thus, repeated explanation will be omitted.

However, the spherical concave lens 413 diverges a Y-axis directional component of the laser beam unlike the cylindrical concave lens 411, and, thus, the second cylindrical convex lens 415 is additionally needed.

As depicted in FIG. 6, the Y-axis directional component of the laser beam diverged through the spherical concave lens 413 passes through the first cylindrical convex lens 414 and then its divergence angle is corrected by the second cylindrical convex lens 415. That is, as for the Y-axis directional component of the laser beam, the first cylindrical convex lens 414 may be regarded as nonexistent. Therefore, if the distance between the spherical concave lens 413 and the second cylindrical convex lens 415 is distant from the sum of the focal length of the spherical concave lens 413, the focal length of the second cylindrical concave lens 415 and the increasing component of the focal length depending on the divergence angle of the laser beam, a length of the spot of the laser beam condensed by the condensing lens 430 becomes increased (see FIG. 6(a)). On the contrary, if the distance between the spherical concave lens 413 and the second cylindrical convex lens 415 is close to the sum of the focal length of the spherical concave lens 413, the focal length of the second cylindrical concave lens 415 and the increasing component of the focal length depending on the divergence angle of the laser beam, the length of the spot of the laser beam condensed by the condensing lens 430 becomes decreased (see FIG. 6(b)).

Herein, the "width" of the spot is an X-axis directional size of the spot, i.e. a longitudinal directional size of the spot of the target object 200 depicted in FIGS. 3, 5, and 6, and the "length" of the spot is a Y-axis directional size of the spot, i.e. a transversal directional size of the spot of the target object depicted in FIGS. 3, 5, and 6.

If the spot has a small width and a large length, a minor axis of the spot is formed in an X-axis direction and a major axis of the spot is formed in a Y-axis direction (see FIGS. 3(b) and 5(b)). When the major axis direction of the spot is aligned with a scribed direction, a process can be performed efficiently and rapidly and the target object 200 may be subject to self-breaking. The details thereof will be explained with reference to FIGS. 15 to 20.

Figure 16:
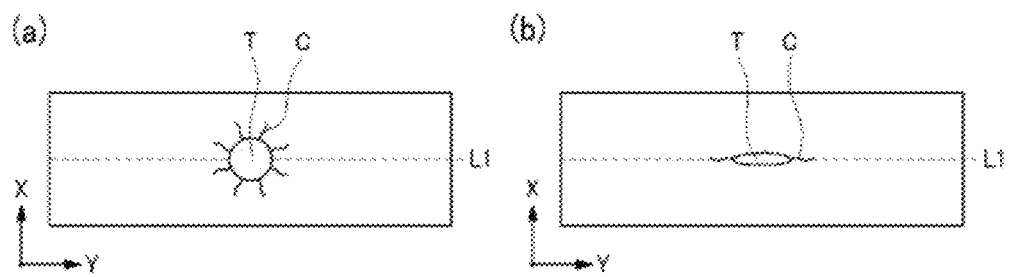
FIG. 16 is an explanatory diagram which shows a relationship between a shape of a spot and a scribed direction.
Figure 17:
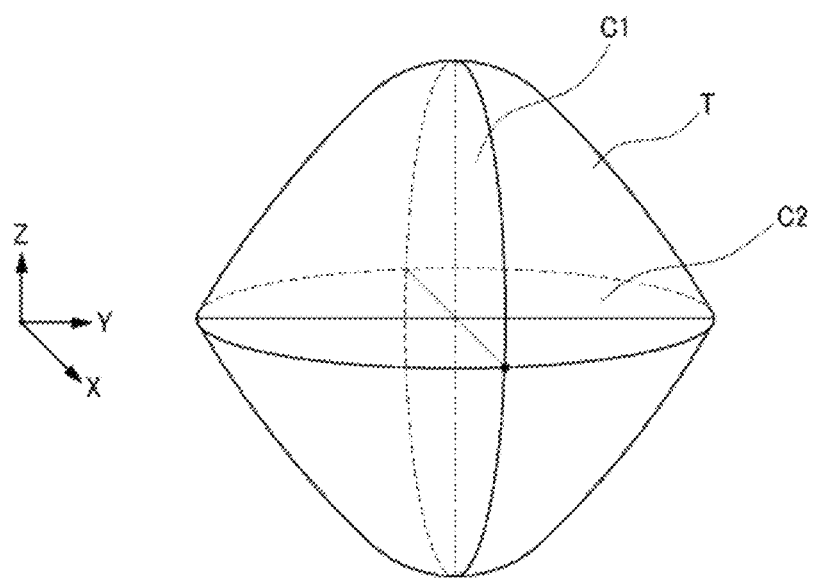
FIG. 17 shows a phase transformation area formed by a laser beam spot.
Figure 18:
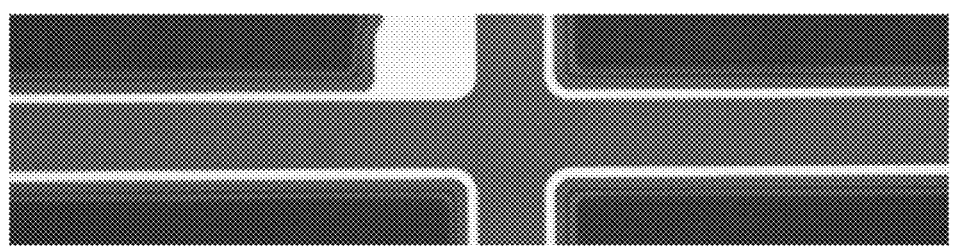
FIGS. 18 and 19 are actual photos for comparing a self-breaking-processed substrate and an unprocessed substrate.
Figure 19:
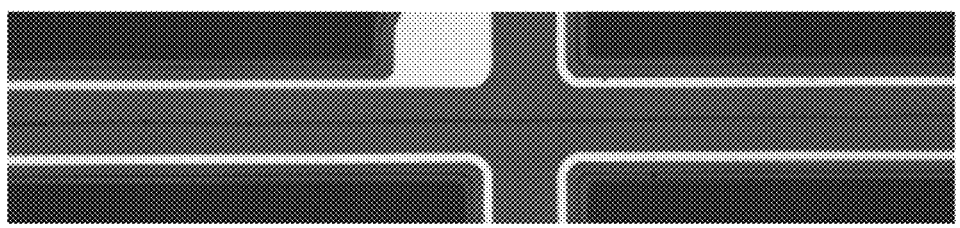

FIG. is an explanatory diagram which shows a stress concentration depending on a shape of a phase transformation area, FIG. 16 is an explanatory diagram which shows a relationship between a shape of a spot and a scribed direction, FIG. 17 shows a phase transformation area formed by a laser beam spot, and FIGS. 18 and 19 are actual photos for comparing a self-breaking-processed substrate and an unprocessed substrate.

FIG. 15(a) shows a case in which a spot is formed into a circular shape since a divergence angle of a laser beam is not corrected. In this case, from a cross section (XZ plane) of a phase transformation area T cut perpendicular to a scribed direction (Y-axis direction) of a target object, it can be seen that the spot has a substantially circular shape. That is, a Z-axis directional size of the phase transformation area T becomes equal to an X-axis directional size thereof.

On the contrary, FIG. 15(b) shows a case in which a spot is formed into an elliptical shape since a divergence angle of a laser beam is corrected. In this case, from a cross section (XZ plane) of a phase transformation area T cut perpendicular to a scribed direction (Y-axis direction) of a target object, it can be seen that the spot has an elliptical shape perpendicular to the scribed direction. That is, as described in the drawing, in the cross section of the phase transformation area T, an X-axis directional size is small and a Z-axis directional size is large. A three-dimensional view of the phase transformation area T may be shown as depicted in FIG. 17, and it can be seen that both a cross section C1 in a longitudinal direction and a cross section C2 in a transversal direction are formed into an elliptical shape.

Figure 15:
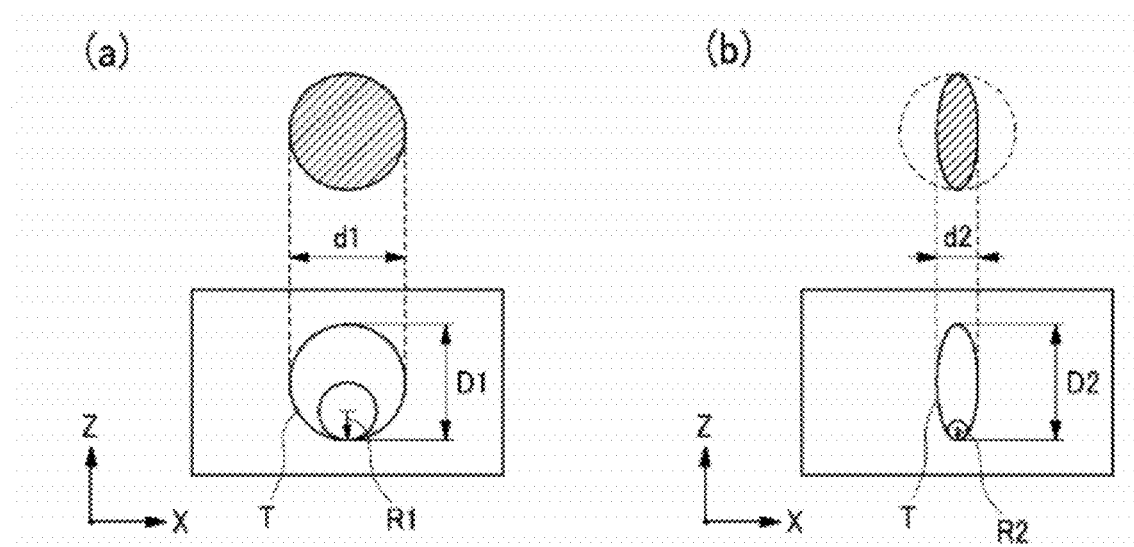
FIG. 15 is an explanatory diagram which shows a stress concentration depending on a shape of a phase transformation area.

It can be seen from FIG. 15 that at an end point of a phase transformation area T in a longitudinal direction, a radius of curvature R2 of an elliptical spot is smaller than a radius of curvature R1 of a circular spot.

Generally, a level of stress generated at a specific point of a phase transformation area T can be expressed as a stress concentration factor S as follows.

$$S = 2\sqrt{\frac{D}{R}}$$ Equation 6

Here, D denotes a longitudinal directional size of the phase transformation area T and R denotes a radius of curvature at the point.

If the stress concentration factor at the end point of the phase transformation area T in the longitudinal direction is S1 in case of a circular spot and the stress concentration factor at the end point of the phase transformation area T in the longitudinal direction is S2 in case of an elliptical spot, a longitudinal directional size D1 of the phase transformation area T in case of the circular spot is similar to a longitudinal directional size D2 of the phase transformation area T in case of the elliptical spot and the radius of curvature R1 is greater than the radius curvature R2, and, thus, S1 becomes smaller than S2. That is, in case of the elliptical spot, the stress is concentrated at the end point of the phase transformation area T in the longitudinal direction as compared to the circular spot.

Due to the concentration of the stress, in case of the elliptical spot, cracks may be concentrated at an end point in a major axis direction thereof (see FIG. 16(b)). In other words, in case of the elliptical spot, a stress concentration point where a stress is concentrated as compared to other areas is formed in the phase transformation area T. The stress concentration point is formed within the phase transformation area T at the closest to a front surface or a rear surface of the target object. A radius of curvature of the phase transformation area T becomes minimized at the stress concentration point, and, thus, more cracks may occur at the stress concentration point than other areas.

However, in case of the circular spot, there is no area where the stress is particularly concentrated, and, thus, cracks may not occur or cracks may occur randomly without any specific directionality (see FIG. 16(a)). That is, in case of the circular spot, it is impossible to control an occurrence of cracks, and, thus, a self-breaking process is not performed, or cracks may occur in an unwanted direction, and, thus, a cut surface may have a defect.

In case of the elliptical spot, if the optical unit 400 and the target object 200 are arranged such that a major axis of the spot is aligned in the same line with a preset cut line L1 of the target object 200, the spot is formed in a direction along the preset cut line L1. Thus, a stress is concentrated at a phase transformation area formed at both ends of the spot positioned on the preset cut line L1 and cracks occur in a direction along the preset cut line L1. Therefore, since a gap between the spots can be increased, a processing rate can be remarkably improved. Such cracks reach the surface or the rear surface of the target object, the target object may be subject to self-breaking. In this case, a wafer can be cut into chips just by irradiating a laser beam to the inside of the target object 200 without any further cutting process, resulting in a decrease in the number of processes, a decrease in processing time and a decrease in costs.

As described above, by correcting a divergence angle of a laser beam and condensing the corrected laser beam into a target object, cracks may be induced to occur in a scribed direction (i.e. in a major axis direction of an elliptical or linear spot).

If the target object is thick, plural spots may be formed in a longitudinal direction (thickness direction) of the target object. At this time, in case of the circular spot, as described above, cracks (micro cracks) may occur randomly in each spot. Therefore, cracks in a single spot may be connected with cracks in adjacent spots and propagation of the cracks may be amplified. As compared to a case of a single spot (formed in the target object in the thickness direction), such a long crack without directionality may add to the random occurrence of the cracks.

However, in case of the elliptical spot, cracks in a single spot may be propagated along a scribed direction, i.e. a direction in which a cut surface is formed, and such a spot including the cracks is formed in plural points in the target object in the thickness direction, so that a self-breaking effect becomes increased.

If the target object is subject to self-breaking as described above, the target object can be separated or cut by very little external force and desirably, without any external force as compared to a conventional case. Actually, if a phase transformation area of the circular spot is formed within the target object (if a self-breaking process is not performed), external cutting force F1 substantially the same as provided to form a preset cut line by irradiating a laser beam to a front surface or a rear surface of the target object is needed, but if an elliptical spot is formed within the target object and a self-breaking process is performed, the target object may be cut by little external force F2 less than one several tenth of the force needed for the circular spot.

In particular, in case of the circular spot, the cutting force F1 is applied uniformly to the cracks formed without any specific directionality, and, thus, a cut surface may have a defect caused by amplification of propagation of the cracks in an unwanted direction. However, in case that the elliptical spot is formed within the target object by correcting a divergence angle of the laser beam, cracks may be induced to occur in a cut direction and even if cracks may occur in other directions than the cut direction, the external force F2 applied to these cracks may be very little, and, thus, a cut surface may hardly have a defect caused by amplification of propagation of the cracks in other directions than the cut direction.

FIG. 18 is a photo showing that a laser beam is irradiated to an actual device obtained by forming stacked portions on a surface of a target object. To be specific, FIG. 18 is a photo as taken from a rear surface to which a laser beam is irradiated after a target object is scribed and before a cutting process is performed. FIG. 18 shows a case in which a divergence angle of a laser beam is not corrected and a circular spot is formed, and FIG. 19 shows a case in which a divergence angle of a laser beam is corrected and an elliptical spot is formed. FIG. 19 shows a clean self-breaking line (i.e. a line drawn in a transversal direction from the center of the drawing) formed in a scribed direction (i.e. in a Y-axis direction). On the contrary, FIG. 18 does not show a self-breaking line in a scribed direction. That is, the target object can be cut by applying a physical or thermal impact thereto in a subsequent process.

In the present specification, the term "self-breaking" includes a case in which cracks in a phase transformation area formed within a target object propagate and reach a front surface or a rear surface of the target object, so that the target object is completely cut, a case in which even if cracks do not reach a front surface or a rear surface of a target object, the cracks propagate to be very close to the front surface or the rear surface of the target object, or a case in which some of cracks reach a front surface or a rear surface of a target object and the other cracks do not.

Although not illustrated, the laser beam may be polarized in a specific direction. If a polarized direction of the laser beam is aligned in the same line with a scribed direction, a cut surface of the target object becomes clean and a cut width becomes decreased. Therefore, a cut quality becomes improved and more chips can be obtained from a same size wafer. On the contrary, if the polarized direction of the laser beam is orthogonal to the scribed direction, the cut surface of the target object becomes rough and the cut width becomes increased.

The target object processing apparatus 1 in accordance with the above-described embodiments of the present disclosure may further include the light condensing distance adjusting unit 700 which changes a relative position of the target object 200 with respect to the condensing lens 430. The light condensing distance adjusting unit 700 may adjust a depth of a condensing point, i.e. a spot, within the target object 200.

In the present disclosure, a phase transformation area T is formed only within a target object 200 by forming a spot P of a laser beam within the target object 200 instead of on a surface of the target object 200, and, thus, there is no chance that the laser beam is absorbed into the surface of the target object 200 and the surface is melted. Consequently, the surface of the target object 200 may not be uneven and the target object may be less cracked in unexpected directions when broken. Further, deterioration in strength and characteristics of the target object 200 caused by an occurrence of irregular micro cracks does not occur.

Furthermore, since the phase transformation area T is formed within the target object 200 instead of on the surface thereof, the amount of fine dust generated at the time of processing the target object 200 is remarkably decreased.

Figure 8:
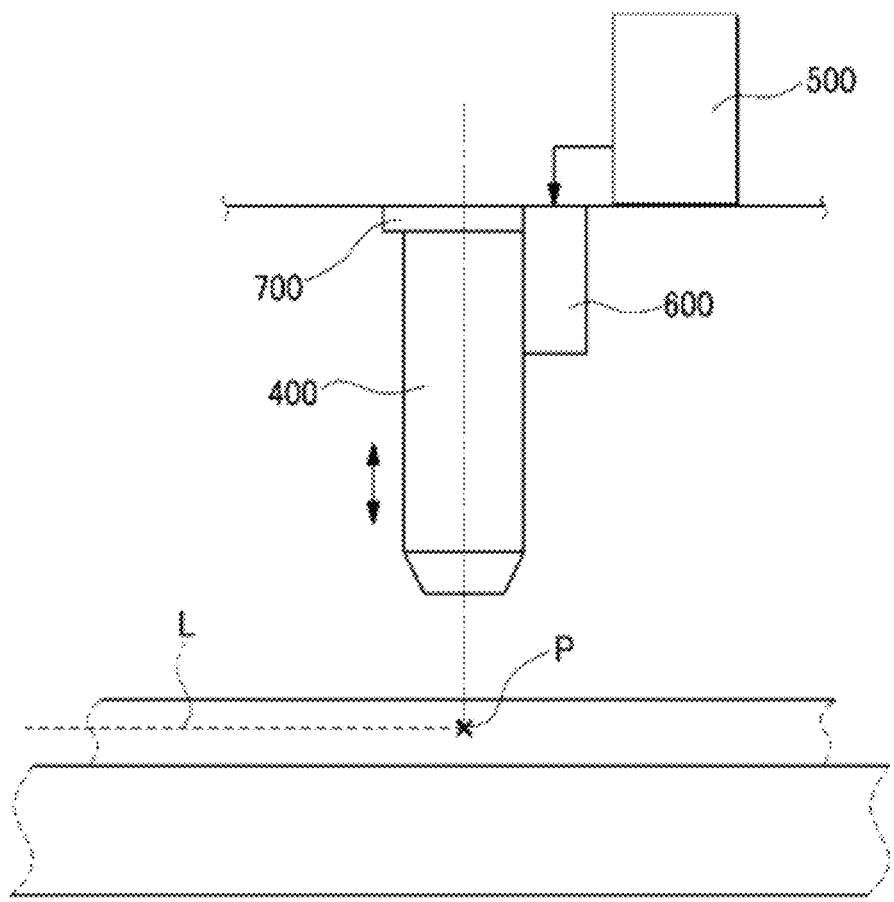
FIG. 8 is a configuration view schematically showing a condensing point position control unit of a target object processing apparatus in accordance with an embodiment of the present disclosure.

There will be explained a method of adjusting a depth of the spot P formed within the target object 200 with reference to FIGS. 8 and 9.

If a phase transformation area T is formed within the target object 200 at a position closer to a front surface rather than a rear surface, accuracy of cutting can be improved. However, if the target object 200 is thin, the phase transformation area T formed around the spot P may be formed on the front surface of the target object 200 and exposed to the outside. Therefore, the depth of the spot P needs to be adjusted accurately.

In order to adjust the depth of the spot P, a relative position of the target object 200 with respect to the condensing lens 430 may be changed. A distance between the condensing lens 430 and the front surface of the target object 200 is measured by a non-illustrated condensing point position detection unit, the controller 500 controls the light condensing distance adjusting unit 700 based on the measured information to move the optical unit 400 vertically such that the spot P is positioned at a desired depth (see FIG. 8). At this time, as the light condensing distance adjusting unit 700, an actuator using a piezo element may be used. A piezo actuator is a kind of actuator using a piezoelectric sensor and it is used to generate a several nano-resolution movement.

Figure 9:
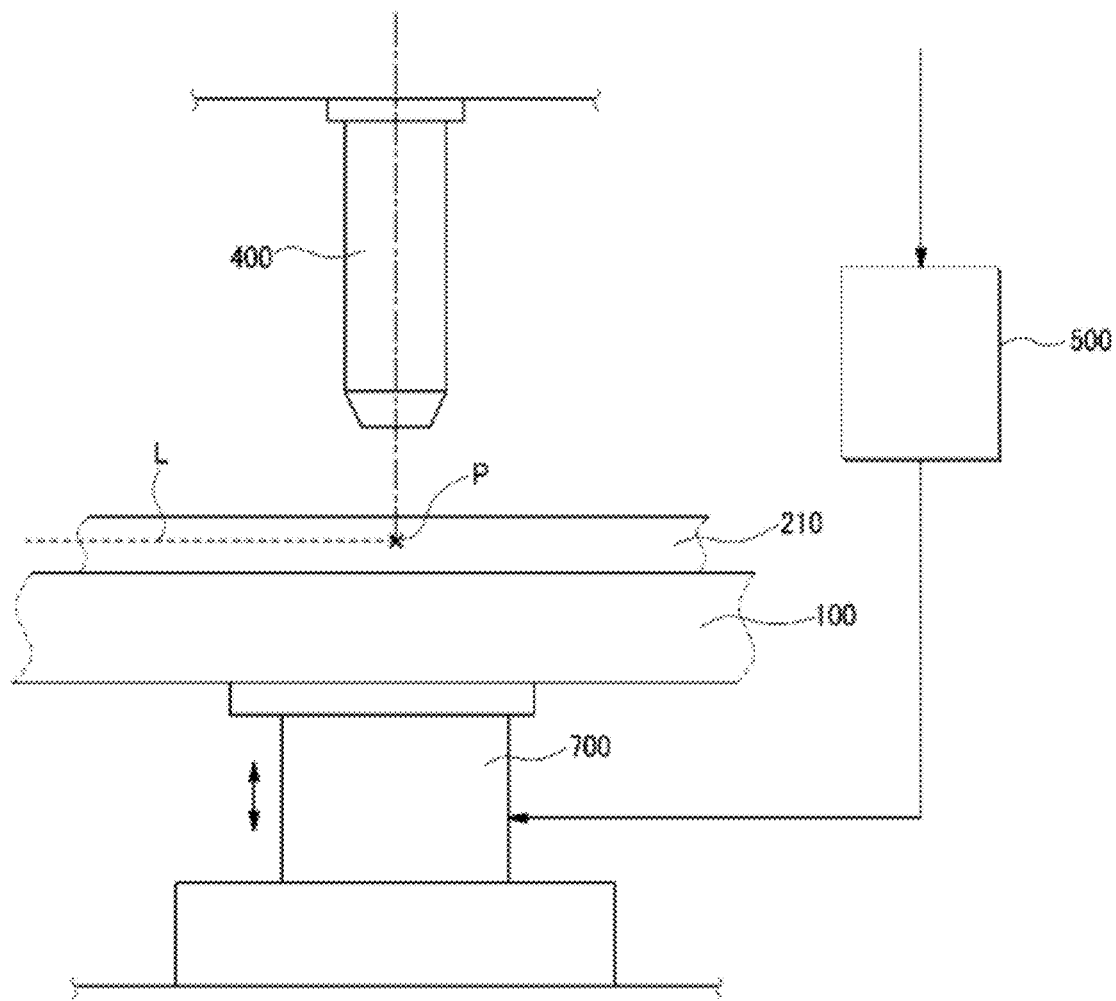
FIG. 9 is another configuration view schematically showing a condensing point position control unit of a target object processing apparatus in accordance with an embodiment of the present disclosure.

Alternatively, the light condensing distance adjusting unit 700 may be provided under the mounting table 100 on which the target object 200 is mounted and the mounting table 100 may be moved vertically, instead of moving the optical unit 400 vertically, based on information of a distance between the condensing lens 430 and the surface of the target object 200 measured by the non-illustrated condensing point position detection unit (see FIG. 9).

As described above, a target object processing system capable of forming a phase transformation area T within a target object 200 by irradiating a laser beam to the inside of the target object 200 can change a shape or a size of a spot P formed within the target object 200 by making a laser beam generated from a laser beam source 300 pass through an optical unit 400.

Further, the target object processing system can change at least one axis directional size of the spot P by changing distances between components within the optical unit 400. At this time, a major axis of the spot P is formed along a preset cut line L of the target object 200.

As described above, in an embodiment of the present disclosure, the target object processing apparatus 1 capable of self-breaking the target object 200 with a laser beam may include the laser beam source 300 capable of generating a laser beam, the beam shaping module 410 capable of correcting a divergence angle of the generated laser beam, the condensing lens 430 capable of forming a spot by condensing the corrected laser beam to the inside of the target object 200, and the controller 500 connected with the laser beam source 300, the beam shaping module 410, and the condensing lens 430 and controlling them.

As depicted in FIG. 1, a laser processing apparatus 1 includes a driving unit 101 installed on a frame 100, a mounting table 102 installed on the driving unit 101 so as to be movable horizontally and vertically, a laser beam source 103 provided above the mounting table 102, a beam shaping module 104 provided under the laser beam source 103, a light concentrating unit 105 provided under the beam shaping module 104, and a controller 106 connected with the driving unit 101, the laser beam source 103, the beam shaping module 104, and the light concentrating unit 105 and controlling them. Here, a shape or a size of the spot is adjusted by correcting the divergence angle of the laser beam and a phase transformation area is formed within the target object 200 by the spot and the target object 200 may be subject to self-breaking with the phase transformation area as the starting point.

Hereinafter, a target object processing method will be explained.

A target object processing method in which a target object is subject to self-breaking by using a laser beam may include generating a laser beam from a laser beam source 300, correcting a divergence angle of the generated laser beam, and forming a spot P by condensing the corrected laser beam into a target object 200. Here, a shape or a size of the spot is adjusted by correcting the divergence angle of the laser beam and a phase transformation area is formed within the target object 200 by the spot and the target object 200 may be subject to self-breaking with the phase transformation areas as the starting point.

Further, a target object processing method capable of self-breaking a target object, on which stacked portions are formed, by using a laser beam may include generating a laser beam from a laser beam source 300, correcting a divergence angle of the generated laser beam, and forming a spot P by condensing the corrected laser beam into a target object 200. Here, a shape or a size of the spot is adjusted by correcting the divergence angle of the laser beam and a phase transformation area is formed within the target object 200 by the spot and the target object 200 may be subject to self-breaking with the phase transformation areas as the starting point.

Here, the stacked portions may include nitride layers or metal layers. Further, the nitride layers may include a gallium compound. Furthermore, the target object 200 may be a semiconductor substrate or a sapphire substrate. The laser beam may be incident onto the rear surface of the target object 200 on which the stacked portions are not formed.

A stress concentration point is formed within the phase transformation area T at the closest to the front surface or the rear surface of the target object 200. Further, a radius of curvature of the phase transformation area T may be minimized at the stress concentration point. The phase transformation area T may not reach the front surface or the rear surface of the target object 200.

The process of correcting the divergence angle of the laser beam may include making the laser beam pass through a cylindrical concave lens 411 and making the laser beam passing through the cylindrical concave lens 411 pass through a cylindrical convex lens 412 (see FIG. 2). Here, the cylindrical concave lens 411 and the cylindrical convex lens 412 may substantially correct the same directional divergence angle of the laser beam. Further, a width of the spot may be changed by changing a distance between the cylindrical concave lens 411 and the cylindrical convex lens 412.

The process of correcting the divergence angle of the laser beam may include making the laser beam pass through a spherical concave lens 413, making the laser beam passing through the spherical concave lens 413 pass through a first cylindrical convex lens 414, and making the laser beam passing through the first cylindrical convex lens 414 pass through a second cylindrical convex lens 415 (see FIG. 4).

The first cylindrical convex lens 414 may correct a divergence angle of the laser beam in a first direction and the second cylindrical convex lens 415 may correct a divergence angle of the laser beam in a second direction substantially orthogonal to the first direction. Here, the first direction (an X-axis direction or a width direction of the spot) may be orthogonal to a major axis of the spot, and the second direction (a Y-axis direction or a longitudinal direction of the spot) may be parallel to the major axis of the spot. The direction parallel to the major axis of the spot may be a direction in which a preset cut line of a LED substrate is formed, i.e. a scribed direction.

A width of the spot may be changed by changing a position of the first cylindrical convex lens 414 between the spherical concave lens 413 and the second cylindrical convex lens 415. Further, a length of the spot may be changed by changing a position of the second cylindrical convex lens 415 between the first cylindrical convex lens 414 and the condensing lens 430.

The target object processing method may further include making a laser beam, of which a divergence angle is corrected, pass through a beam stopper 420.

The process of forming the spot by condensing the laser beam to the inside of the target object 200 may include making the laser beam pass through the condensing lens 430.

Plural spots may be formed within the target object 200 in a longitudinal direction by changing a distance between the condensing lens 430 and the target object 200. Further, plural spots may be formed within the target object 200 in a transversal direction by changing a relative position of the target object 200 with respect to the spots to be in a transversal direction along a preset cut line. A preset cut line of the target object 200 is formed along the transversal direction and a major axis direction of the spot may be substantially the same as the transversal direction.

The target object processing method may further include cutting the target object 200 along the preset cut line.

In a target object processing method capable of self-breaking a target object 200 using a laser beam, after a laser beam generated from a laser beam source passes through a beam shaping module 410 and a divergence angle of the laser beam is corrected, the corrected laser beam is condensed to the inside of the target object 200, so that a phase transformation area including a stress concentration point is formed within the target object 200.

Further, in a target object processing method capable of self-breaking a target object 200, on which stacked portions are formed, by using a laser beam, after a laser beam generated from a laser beam source passes through a beam shaping module 410 and a divergence angle of the laser beam is corrected, the corrected laser beam is condensed to the inside of the target object 200, so that a phase transformation area including a stress concentration point is formed within the target object 200.

Here, the target object 200 may be subject to self-breaking from the stress concentration point in a direction toward the front surface of the target object on which the stacked portions are formed.

A target object processing method using a laser beam will be explained in detail with reference to the drawings.

Figure 10:
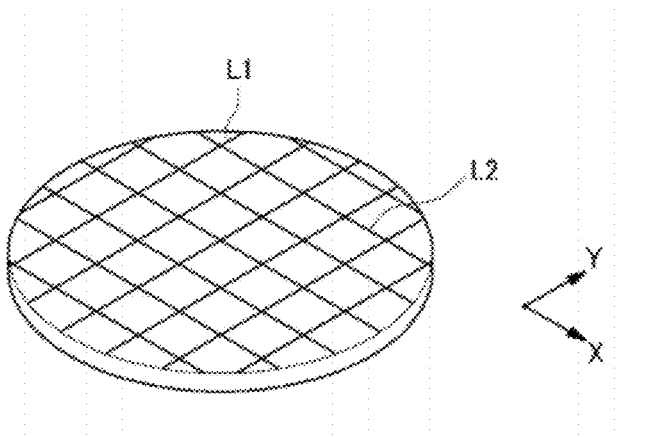
FIG. 10 is a plane view schematically showing a wafer as an example of a target object in accordance with an embodiment of the present disclosure.
Figure 11:
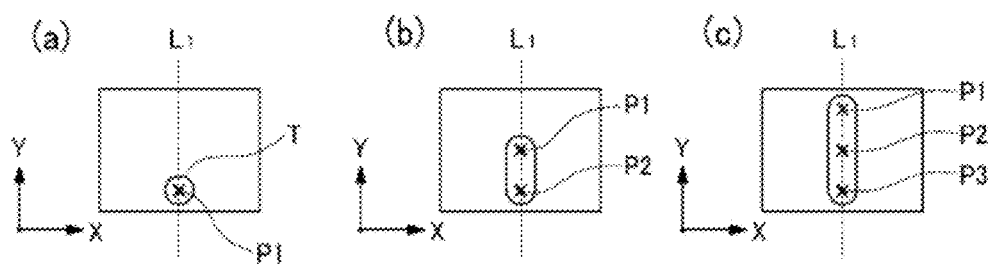
FIG. 11 is a plane view showing a substrate in which a phase transformation area is formed.
Figure 12:
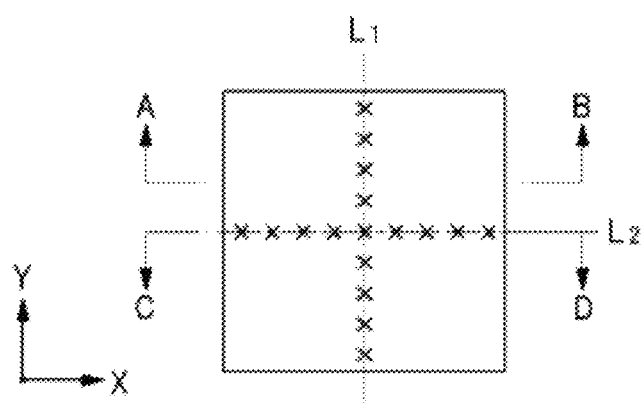
FIG. 12 is a transversal cross-sectional view showing a substrate in which two crossed phase transformation areas are formed.
Figure 13:
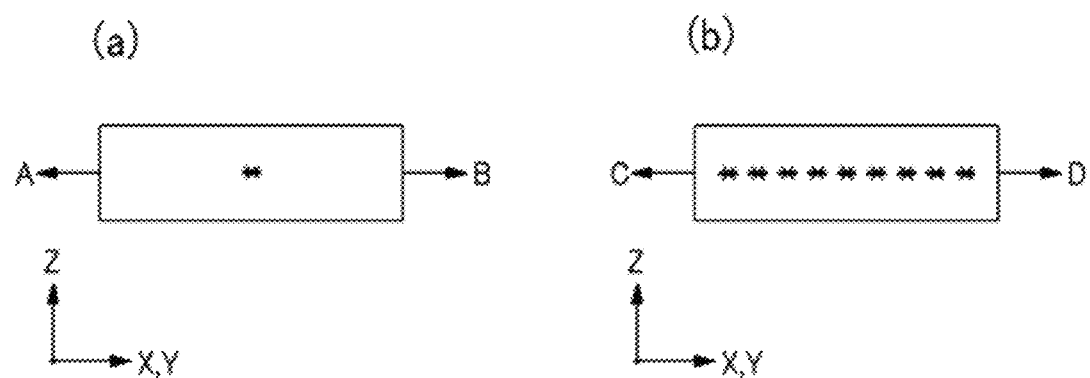
FIG. 13 is a longitudinal cross-sectional view showing a substrate in which a phase transformation area is formed.

FIG. 10 is a plane view schematically showing a wafer as an example of a target object in accordance with an embodiment of the present disclosure, FIG. 11 is a plane view showing a substrate in which a phase transformation area is formed, FIG. 12 is a transversal cross-sectional view showing a substrate in which two crossed phase transformation areas are formed, and FIG. 13 is a longitudinal cross-sectional view showing a substrate in which a phase transformation area is formed.

As depicted in FIG. 10, a scribing target object 200 on which preset cut lines L1 and L2 orthogonal to each other are drawn at a regular space is mounted on a mounting table 100.

Then, a laser beam source 300 generates and outputs a laser beam, the output laser beam diverges, and a divergence angle of the laser beam is corrected. Thereafter, the corrected laser beam is condensed to the inside of the target object 200 and a spot P is formed.

If a spot P1 is formed at an inner position perpendicular to the preset cut line L1 while avoiding the stacked portions 200 formed on a front surface of the target object 200, a phase transformation area T is formed around the spot P1 (see FIG. 11(a)). Subsequently, a relative position of the target object 200 with respect to a condensing lens 430 is changed by moving the mounting table 100 so as to form spots P2 and P3 to be adjacent to the spot P1 within the target object 200 in a transversal direction along the preset cut line L1 (see FIGS. 11(b) and 11(c)).

In this case, a preset cut line L of the target object 200 is drawn along the transversal direction and a major axis direction of the spot P is substantially the same as the transversal direction.

FIG. 12 shows that all the spots P required to be positioned on the preset cut lines L1 and L2 are formed as described above. The phase transformation area T is formed to be connected with a periphery of the spot P within the target object 200. FIG. 13 a longitudinal cross-sectional view showing a target object 200 in which a phase transformation area T is formed.

After the phase transformation area T is formed within the target object 200, the target object 200 may be cut along the preset cut line L from the phase transformation area T.

To be specific, the target object 200 may be cut by applying an external force the phase transformation area T such that cracks occur from the phase transformation area T in a direction toward a front surface or a rear surface of the target object 200.

By way of example, both sides of the target object 200 with the preset cut line L as the center are fixed with jigs or the like and the both sides of the target object 200 with the preset cut line L as the center are bent or a pressing member having a tip is moved upward from the rear surface of the target object 200 along the preset cut line L, so that an external force can be applied upward from the rear surface of the target object 200. In this case, cracks may occur from the phase transformation area T in a direction toward the front surface of the target object 200 and the target object 200 may be cut.

Alternatively, the target object 200 can be cut by applying an external force downward from the front surface of the target object, or the target object 200 can be cut by attaching an extension film to the rear surface of the target object 200 and extending the extension film in a plane direction to apply a tensile force to the target object 200.

In an embodiment of the present disclosure, cracks may occur from a phase transformation area T in a direction toward a front surface or a rear surface of a target object 200 by accurately adjusting a depth of a spot P and the cracks may reach the front surface or the rear surface of the target object 200, so that the target object 200 may be subject to self-breaking in the same manner as described above. At this time, if the target object 200 is thick, plural spots P1 and P2 may be formed in a longitudinal direction within the target object 200 by changing a distance between a condensing lens and the target object 200. Then, the target object 200 may be cut by applying an external force thereto or the target object 200 may be subject to self-breaking. In case of the target object 200 which is subject to self-breaking, a subsequent cutting process may be not needed, but the above-described cutting or separating process may be performed in order to surely separate the target object 200 into chips.

The above description of the present invention is provided for the purpose of illustration, and it would be understood by those skilled in the art that various changes and modifications may be made without changing technical conception and essential features of the present invention.

Thus, it is clear that the above-described embodiments are illustrative in all aspects and do not limit the present invention. By way of example, each component described to be of a single type can be implemented in a distributed manner. Likewise, components described to be distributed can be implemented in a combined manner.

The scope of the present invention is defined by the following claims rather than by the detailed description of the embodiment. It shall be understood that all modifications and embodiments conceived from the meaning and scope of the claims and their equivalents are included in the scope of the present invention.

What is claimed is:

1. A target object processing method capable of self-breaking a target object with a laser beam, the target object processing method performed by a target object processing apparatus and comprising:
providing the target object processing apparatus comprising a laser beam source generating the laser beam, a cylindrical concave lens receiving the laser beam directly from the laser beam source, and a cylindrical convex lens correcting a divergence angle of the laser beam diverged through the cylindrical concave lens;
generating the laser beam from the laser beam source;
correcting the divergence angle of the generated laser beam in only one direction by aligning the cylindrical concave lens and the cylindrical convex lens in the same direction and by making the laser beam received directly from the laser beam source pass through the cylindrical concave lens, and then making the laser beam passing through the cylindrical concave lens pass through the cylindrical convex lens;
forming a spot inside the target object along a preset cut line by condensing the corrected laser beam to the inside of the target object; and
adjusting a distance between the cylindrical concave lens and the cylindrical convex lens to change a width of the spot in a direction perpendicular to the preset cut line, the width being decreased when the distance is decreased, and to change a shape of the spot according to the adjusted distance,
wherein correcting the divergence angle of the laser beam causes the spot with the changed width to have an elliptical shape of which a major axis is aligned along the preset cut line such that a stress concentration point is formed at both ends of the spot in the major axis direction and cracks occur from the stress concentration point, and
wherein a phase transformation area is formed within the target object around the spot such that the target object is subject to self-breaking along the preset cut line with the phase transformation area as a starting point.

2. The target object processing method of claim 1,
wherein a stress concentration point is formed within the phase transformation area at the closest to a front surface or a rear surface of the target object.

3. The target object processing method of claim 2,
wherein a radius of curvature of the phase transformation area is minimized at the stress concentration point.

4. The target object processing method of claim 1, further comprising:
making the corrected laser beam pass through a mask after the divergence angle of the laser beam is corrected.

5. The target object processing method of claim 1,
wherein forming the spot by condensing the laser beam to the inside of the target object comprises:
making the laser beam pass through a condensing lens.

6. The target object processing method of claim 5,
wherein the spot is formed in plural positions in a longitudinal direction within the target object by changing a distance between the target object and the condensing lens.

7. The target object processing method of claim 5,
wherein the spot is formed in plural positions in a transversal direction within the target object by changing a relative position of the target object with respect to the spot to be in a transversal direction along the preset cut line.

8. The target object processing method of claim 7,
wherein the preset cut line of the target object is formed along the transversal direction and a major axis direction of the spot is substantially the same as the transversal direction.

9. The target object processing method of claim 1,
wherein stacked portions are formed on a front surface of the target object.

10. The target object processing method of claim 1,
wherein the target object is a sapphire substrate.

11. The target object processing method of claim 1, wherein the formed spot initially has a circular shape prior to correcting the divergence angle of the generated laser beam.

* * * * *